United States Patent [19]

Träger et al.

[11] Patent Number: 5,380,766

[45] Date of Patent: Jan. 10, 1995

[54] PROCESS FOR THE PREPARATION OF PREFOAMED POLYOLEFIN PARTICLES

[75] Inventors: Michael Träger, Haltern; Thomas Leven, Lüdenscheid, both of Germany

[73] Assignee: Huels Aktiengesellschaft, Marl, Germany

[21] Appl. No.: 246,166

[22] Filed: May 19, 1994

[30] Foreign Application Priority Data

Jun. 14, 1993 [DE] Germany ............... 4319587

[51] Int. Cl.$^6$ ............................................. C08J 9/18
[52] U.S. Cl. ................................... 521/60; 521/58; 521/59
[58] Field of Search ................... 521/60, 58, 59

[56] References Cited

U.S. PATENT DOCUMENTS

| | | | |
|---|---|---|---|
| 4,436,840 | 3/1984 | Akiyama et al. | 521/60 |
| 4,504,601 | 3/1985 | Kuwabara et al. | 521/60 |
| 4,596,833 | 6/1986 | Endo et al. | 521/60 |
| 4,602,047 | 7/1986 | Akiyama et al. | 521/60 |
| 4,602,082 | 7/1986 | Akiyama et al. | 521/60 |
| 4,626,555 | 12/1986 | Endo et al. | 521/60 |
| 4,656,197 | 4/1987 | Yoshimura et al. | 521/60 |
| 4,689,351 | 8/1987 | Endo et al. | 521/60 |
| 4,692,507 | 9/1987 | Akiyama et al. | 521/60 |
| 4,749,725 | 6/1988 | Akiyama et al. | 521/60 |
| 4,812,484 | 3/1989 | Endo et al. | 521/60 |
| 4,908,393 | 3/1990 | Arai et al. | 521/60 |
| 5,015,667 | 5/1991 | Yoshimura et al. | 521/60 |
| 5,032,620 | 5/1991 | Arai et al. | 521/60 |
| 5,122,545 | 6/1992 | Kawabara et al. | 521/60 |

*Primary Examiner*—Morton Foelak
*Attorney, Agent, or Firm*—Oblon, Spivak, McClelland, Maier & Neustadt

[57] ABSTRACT

Foamed polyolefin particles are prepared by dispersion foaming of components consisting essentially of polyolefin particles, a liquid dispersing agent and optionally a volatile blowing agent in a reaction system consisting essentially of a reactor equipped with a stirrer containing said components and a discharge jet, comprising the step of:

gassing the components of the reactor by injecting an inert gas into the dispersion below the surface of the liquid in the reactor;

and simultaneously discharging a three phase mixture of liquid dispersing agent, polymer particles and gas through said jet.

10 Claims, No Drawings

PROCESS FOR THE PREPARATION OF PREFOAMED POLYOLEFIN PARTICLES

BACKGROUND OF THE INVENTION

1. Field of the Invention

The present invention relates to a process for the preparation of foamed polyolefin beads which have a uniform cell size over their entire cross-section.

2. Description of the Background

A number of processes are known for the preparation of foamed polyolefin beads by means of dispersion foaming. For example, in DE-A-21 55 775, a dispersion of polymer particles in a liquid dispersing agent is heat treated under pressure, and foamed with subsequent release of the pressure. Foaming is explained by the fact that the dispersing agent infiltrates hollow cavities in the polymer and acts as a blowing agent when ejected into a low pressure space. The polymer should contain 10 to 70% by weight of a filler in order to facilitate the infiltration. Prefoamed beads having a fine and uniform cell structure are obtained by this method. As the examples show, however, the expansion rate is non-uniform. In practice, it has been found that processing of these prefoamed beads to foamed shaped articles is difficult because of the high filler content and the low cell diameter.

Foaming specifically of ethylene/propylene random copolymers is described in EP-A-0 053 333. A system is used there which comprises polymer particles, water as the dispersing agent, a solid dispersion auxiliary and a volatile blowing agent.

It is known from EP-A-0 071 981 that foamed polypropylene beads can be welded to form dimensionally stable moldings if the size of the gas-filled cells within the foam is adjusted such that the cut surface contains no mere than 300 cells per $mm^2$, the molding having a density of 0.026 to 0.060 $g/cm^3$ and a latent heat of crystallization of 9 to 28 cal/g. However, this specification gives no instructions as to what technical measures are necessary to obtain these cell characteristics.

It is furthermore known that, in order to maintain a constant expansion rate of the foam, the let-down pressure must be kept constant such that the gas volume increasing in the reactor as a result of the dispersion being let down is compensated by topping up with inert gases. Letting down in EP-A-0 075 897 is thus carried out under a pressure which is at least 0.7 times the partial pressure of the blowing agent, and preferably greater than or equal to the partial pressure of the blowing agent. The doctrine of BP-A-0 095 109 furthermore is that, in order to achieve a uniform cell structure and a constant expansion rate, not only must the temperature be kept constant as accurately as possible, but the internal pressure and the partial pressure of the blowing agent must also be kept constant.

Nevertheless, by topping up with cold inert gases or cold blowing agent, which must evaporate by absorption of heat in the reactor, depending on its nature, the contents of the reactor cool in an undesirable manner. According to EP-A-0 290 943, this cooling is avoided by the level of liquid in the reactor and therefore the pressure and temperature remaining constant by means of a supply of heating fluid. Since considerable amounts of heating fluid must be supplied, however, this process is associated with a considerable expenditure of energy.

According to the prior art, considerable efforts must therefore be made to achieve a uniform cell structure of the foamed beads. A need therefore continues to exist for an improved method of achieving a uniform cell structure of foamed beads.

SUMMARY OF THE INVENTION

Accordingly, one object of the present invention is to provide a simple process for the preparation of foamed polyolefin beads having a uniform cell structure.

Briefly, this object and other objects of the present invention as hereinafter will become more readily apparent can be attained by a process for preparing foamed polyolefin particles by dispersion foaming of components consisting essentially of polyolefin particles, a liquid dispersing agent and optionally a volatile blowing agent in a reaction system consisting essentially of a reactor equipped with a stirrer containing said components and a discharge jet, comprising the step of gassing the components of the reactor by injecting an inert gas into the dispersion below the surface of the liquid in the reactor;

and simultaneously discharging a three phase mixture of liquid dispersing agent, polymer particles and gas through said jet.

DETAILED DESCRIPTION OF THE PREFERRED EMBODIMENTS

Previously unpublished German Patent Application P 42 11 972.3 of Sep. 4, 1992 describes a continuous process for the preparation of foamed beads of polymers, in which polymer particles and a dispersing agent are fed continuously to a slim, non-stirred mass transfer column operated under pressure and are heated in this column under pressure, after which the dispersion is ejected into a low pressure space and the pressure is thereby released, the polymer particles expanding. In this process, a supporting gas can be injected into the mass transfer column from the bottom.

The subject matter of this patent application does not fall within the scope of the present invention. However, the process of the present invention can be applied to all other continuous or discontinuous processes for dispersion foaming of polyolefins.

An example of a discontinuous process is described as follows.

Suitable polyolefins which can be used include, for example, propylene polymers such as propylene/ethylene or propylene/butylene random copolymers, random terpolymers of ethylene, propylene and 1-butene, ethylene/propylene block copolymers and homopolypropylene; ethylene polymers such as low, medium or high density polyethylene, linear low density polyethylene, ethylene/vinyl acetate copolymers, ethylene/methyl methacrylate copolymers, ionomers or other polyolefins such as polybut-1-ene. An ethylene/propylene random copolymer comprising 1 to 15% by weight of ethylene is preferably employed.

These polymers are in the form of discrete particles. They preferably have an average particle diameter of 0.5 to 5 mm. To achieve uniform foaming, if appropriate, in accordance with the prior art, they can comprise a filler which acts as a nucleating agent.

Water is preferably used as the dispersing agent. However, alcohols such as methanol or ethanol, are also suitable.

To prevent agglomeration, a finely divided dispersing auxiliary and/or a surface-active compound can be added to the mixture of polymer particles and dispersing agents. Suitable examples of agents include calcium phosphate, basic magnesium carbonate, basic zinc carbonate, calcium carbonate, aluminum oxide, barium sulfate, talc, alkylbenzenesulfonates, paraffinsulfonates or ethoxylates.

It is expedient additionally to add a volatile blowing agent in order to adjust the density of the foamed beads. Suitable blowing agents are known in the art and include, for example, saturated aliphatic hydrocarbons such as ethane propane, n-butane, i-butane, pentane and hexane; alicyclic hydrocarbons such as cyclopentane and cyclohexane; halogenated hydrocarbons such as trichloromonofluoromethane, dichlorodifluoromethane, dichlorotetrafluoroethane, trichlorotrifluoroethane, dichloromonofluoromethane, methyl chloride, methylene chloride and ethyl chloride, and also inorganic gases such as, for example, carbon dioxide and nitrogen, in each case individually or as a mixture.

If no volatile blowing agent is added to the reactor, the dispersing agent alone may act as a blowing agent. Although only moderate to average expansion rates are achieved in this manner, this is entirely desirable for many intended uses, for example where a somewhat more rigid foam is required.

The mixture is then heated, as is known in the art, to a temperature above the softening point of the polymer particles, which contains blowing agent if appropriate. The industrially appropriate temperature range depends on the nature and amount of the blowing agent. In general, a temperature range from $T_m - 25°$ C. to $T_m + 10°$ C. is preferred. A temperature program can also be implemented here such as is known, for example, in the disclosure of EP-A-0 123 144.

It is essential for the present invention that, during the subsequent letting down of the contents of the reactor into a low pressure space, the contents of the reactor are gassed such that a three-phase mixture of dispersing agent, polymer particles and gas emerges through the jet. (Any dispersing auxiliary used which would represent a fourth phase is negligible in terms of quantity; this case is also regarded as a three-phase mixture in the context of the invention.)

Any gas which is chemically inert towards the reaction mixture can be used for the purpose of the invention. Inorganic and organic substances which are gaseous under normal conditions such as, for example, nitrogen, $CO_2$, air, argon, methane and ethane, are primarily suitable. However, the blowing agent used can also be subsequently metered in as a vapor during the letting down operation. It is of course also possible to use mixtures of various inert gases, as well as mixtures of blowing agents and inert gas. In cases where an exactly constant internal temperature is required, the gas passed in can also be preheated.

If the blowing agent is to be employed for the gassing, this agent can also be metered into the reactor in liquid form if it has an adequate volatility and if it is ensured by the internal temperature and the internal pressure that the liquid blowing agent metered in boils at the entry point, and that the gas bubbles thereby formed guarantee gassing of the jet. In this case too, the liquid blowing agent can be preheated before being metered in.

It is important in the invention that the gas introduced into the reactor be metered into the dispersion, since only in this manner does a three-phase mixture enter the jet. In a preferred embodiment, the gas is passed in close to the base of the reactor, particularly preferably below the stirrer. Gas bubbles can in this manner be easily transported to the jet by the flow of material.

In another preferred embodiment, the gassing is carried out before the jet or into the jet. This is particularly advantageous if there is a length of pipe between the reactor and jet.

Another preferred embodiment comprises passing the gas in through the stirrer.

The diameter of the jet should be adapted to the particle diameter such that as far as possible only one particle is let through at once, since otherwise there is the risk of particles agglomerating with one another during the foaming operation. Otherwise, any jet geometry known to the art can be used.

The foamed polymer particles are then washed, if appropriate, in order to remove the dispersing agent, and are separated off and dried in the customary manner.

The foamed polymer particles can be processed to form moldings by known methods. In the machines used for this purpose, the polymer foam is softened or melted incipiently under pressure with the aid of steam of, for example, 1 to 5 bar, the individual foamed particles welding together forming a molding.

Having now generally described this invention, a further understanding can be obtained by reference to certain specific examples which are provided herein for purposes of illustration only and are not intended to be limiting unless otherwise specified.

EXAMPLE 1

A dispersion of 2,260 g of water and 423 g of an ethylene/propylene copolymer having an ethylene content of 3.8% by weight is stirred with 110 g of n-butane at 130° C. in a 5 l stirred autoclave for 30 minutes. Thereafter, nitrogen is bubbled into the liquid by means of a fine-pored sintered metal candle below the stirrer, the gas volume flow being 50 to 200 $l_n$/min. When an internal pressure of 25 bar is reached, the contents of the autoclave are ejected via a jet having an area of 28.3 mm² into a low pressure space, the polymer particles foaming in the process. The results are shown in Table 1.

Comparison Example 1

The procedure is as described in Example 1, with the sole difference being that nitrogen is passed into the gas space of the autoclave. The results are shown in Table 1.

EXAMPLE 2

As described in Example 1, a dispersion of 2,260 g of water and 423 g of an ethylene/propylene copolymer having an ethylene content of 3.8% by weight is stirred with 110 g of n-butane at 130° C. in a 5 l stirred autoclave for 30 minutes. Thereafter, 500 g of cold water (T=18° C.) are introduced into the hot dispersion; the internal temperature thereby dropping to 120° C. Immediately thereafter, nitrogen is bubbled into the liquid by means of a fine-pored sintered metal candle below the stirrer, the gas volume flow being 50 to 200 $l_n$/min. Immediately after an internal pressure of 25 bar is reached, the contents of the autoclave are ejected via a jet having an area of 28.3 mm². The results are shown in Table 1.

Comparison Example 2

The procedure is as described in Example 2, with the sole difference being that nitrogen is passed into the gas space of the autoclave. The results are shown in Table 1.

TABLE 1

| Example | Foam density [g/l] | Cells per mm² | Cell structure |
|---|---|---|---|
| 1 | 45 | 200 | Homogeneous cell structure over the entire cross-section |
| Comp. Ex. 1 | 43 | 28-250 | Course-celled in the edge region |
| 2 | 95 | 180 | Homogeneous cell structure over the entire cross-section |
| Comp. Ex. 2 | 97 | 4 | Shrunken fold in the edge region |

A comparison of Example 1 with Comparison Example 1 clearly shows the effect of gassing.

A comparison of Example 2 with Comparison Example 2 shows the effect of gassing in an even more pronounced manner.

It is clear that the system tolerates a drop in temperature better with gassing: the cell structure, which is extremely important for the processing properties, is retained.

The foamed beads obtained in accordance with Examples 1 and 2 can be processed by known methods without problems to shaped articles of very good quality.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A process for preparing foamed polyolefin particles by dispersion foaming of components consisting essentially of polyolefin particles, a liquid dispersing agent and optionally a volatile blowing agent in a reaction system consisting essentially of a reactor equipped with a stirrer containing said components and a discharge jet, comprising the step of:

gassing the components of the reactor by injecting an inert gas into the dispersion below the surface of the liquid in the reactor;

and simultaneously discharging a three phase mixture of liquid dispersing agent, polymer particles and gas through said jet.

2. The process according to claim 1, wherein the gas used is passed into the reactor close to the base of the reactor.

3. The process according to claim 2, wherein the gas is passed into the reactor below the stirrer.

4. The process according to claim 1, wherein gassing of the contents of the reactor is carried out before the jet or as the contents enter the jet.

5. The process according to claim 1, wherein the inert gas is passed into the reactor through the stirrer.

6. The process according to one of claims 1 to 5, wherein the inert gas is an inorganic or organic substance which is gaseous under normal conditions.

7. The process according to one of claims 1 to 5, wherein the vapor of the blowing agent employed functions as the inert gas.

8. The process according to claim 7, wherein the blowing agent is subsequently metered in as a vapor or in liquid form, the blowing agent passed in optionally being preheated.

9. The process according to claim 1, wherein an ethylene/propylene random copolymer comprising 1 to 15% by weight of ethylene is employed as the polyolefin.

10. The method according to claim 1 wherein said reaction system further consists of a length of pipe between said reactor and said jet.

* * * * *